United States Patent
Peleg et al.

(10) Patent No.: US 8,102,406 B2
(45) Date of Patent: Jan. 24, 2012

(54) METHOD AND SYSTEM FOR PRODUCING A VIDEO SYNOPSIS

(75) Inventors: Shmuel Peleg, Mevaseret Zion (IL); Alexander Rav-Acha, Jerusalem (IL)

(73) Assignee: Yissum Research Development Company of the Hebrew University of Jerusalem, Jerusalem (IL)

(*) Notice: Subject to any disclaimer, the term of this patent is extended or adjusted under 35 U.S.C. 154(b) by 495 days.

(21) Appl. No.: 12/093,684

(22) PCT Filed: Nov. 15, 2006

(86) PCT No.: PCT/IL2006/001320
§ 371 (c)(1),
(2), (4) Date: Oct. 8, 2008

(87) PCT Pub. No.: WO2007/057893
PCT Pub. Date: May 24, 2007

(65) Prior Publication Data
US 2009/0219300 A1    Sep. 3, 2009

Related U.S. Application Data

(60) Provisional application No. 60/736,313, filed on Nov. 15, 2005, provisional application No. 60/759,044, filed on Jan. 17, 2006.

(51) Int. Cl.
*G09G 5/00* (2006.01)
(52) U.S. Cl. ............... 345/629; 345/474; 348/36
(58) Field of Classification Search .......... 345/629, 345/474; 715/723; 348/36, 218, 220; 375/240, 375/240.1
See application file for complete search history.

(56) References Cited

U.S. PATENT DOCUMENTS

| | | | | |
|---|---|---|---|---|
| 6,654,019 | B2 * | 11/2003 | Gilbert et al. | 345/474 |
| 6,665,003 | B1 | 12/2003 | Peleg et al. | |
| 7,127,127 | B2 | 10/2006 | Jojic et al. | |

(Continued)

FOREIGN PATENT DOCUMENTS

JP    2004336172    11/2004

(Continued)

OTHER PUBLICATIONS

Liu, LIjie et al., "Combined Key-frame Extraction and Object-based Video Segmentation", p. 1-30.*

(Continued)

*Primary Examiner* — Chante Harrison
(74) *Attorney, Agent, or Firm* — The Law Office of Michael E. Kondoudis

(57) ABSTRACT

A computer-implemented method and system transforms a first sequence of video frames of a first dynamic scene to a second sequence of at least two video frames depicting a second dynamic scene. A subset of video frames in the first sequence is obtained that show movement of at least one object having a plurality of pixels located at respective x, y coordinates and portions from the subset are selected that show non-spatially overlapping appearances of the at least one object in the first dynamic scene. The portions are copied from at least three different input frames to at least two successive frames of the second sequence without changing the respective x, y coordinates of the pixels in the object and such that at least one of the frames of the second sequence contains at least two portions that appear at different frames in the first sequence.

18 Claims, 7 Drawing Sheets

U.S. PATENT DOCUMENTS

| | | | |
|---|---|---|---|
| 7,149,974 B2 * | 12/2006 | Girgensohn et al. | 715/723 |
| 2006/0117356 A1 | 6/2006 | Jojic et al. | |
| 2008/0208828 A1 * | 8/2008 | Boiman et al. | 707/4 |
| 2009/0237508 A1 * | 9/2009 | Arpa et al. | 348/153 |

FOREIGN PATENT DOCUMENTS

| | | |
|---|---|---|
| JP | 2005210573 | 8/2005 |
| WO | 0178050 A2 | 10/2001 |
| WO | 2004040480 | 5/2004 |
| WO | 2006048875 A2 | 5/2006 |
| WO | 2007057893 A2 | 5/2007 |
| WO | 2008093321 A1 | 8/2008 |

OTHER PUBLICATIONS

Freeman, William, et al., "Motion without Movement", The Media Laboratory, Massachusetts Institute of Technology, 1991, p. 1-4.*

Rav-Acha et al. "Dynamosaics: Video Mosaics with Non-Chronological Time", IEEE Computer Society Conference on Computer Vision and Pattern Recognition CVPR Jun. 2005, p. 58-65.

Pal et al. "Interactive Montages of Sprites for Indexing and Summarizing Security Video", CCPR Jun. 2005, IEEE Computer Society Conference on San Diego p. 1192.

Irani et al. "Efficient Representations of Video Sequences and Their Applications", Signal Processing: Image Communication 1996, vol. 8, No. 4. p. 327-351.

Agarwala et al. "Panoramic Video Textures", Siggraph 2004, p. 821-827.

Rav-Acha et al. "Making a Long Video Short: Dynamic Video Synopsis", Computer and Vision and Pattern Recognition Jun. 2006, IEEE Computer Society Conference on New York, p. 435-441.

International Search Report for PCT/IL2006/001320, Completed by the European Patent Office May 18, 2007, 3 Pages.

International Search Report for PCT/IL2007/001520, Completed by the European Patent Office Apr. 15, 2008, 3 Pages.

Rav-Acha et al. "Dynamosaics: Video Mosaics with Non-Chronological Time", IEEE Computer Society Conference on Computer Vision and Pattern Recognition CVPR Jun. 2005, p. 58-65. (For discussion, please see attached).

Pal et al. "Interactive Montages of Sprites for Indexing and Summarizing Security Video", CCPR Jun. 2005, IEEE Computer Society Conference on San Diego p. 1192. (For discussion, please see attached).

Attached discussions, 2 pages.

Office Action issued on Jul. 5, 2011, for JP application No. 2008-539616.

* cited by examiner

FIG. 5a                    FIG. 5b

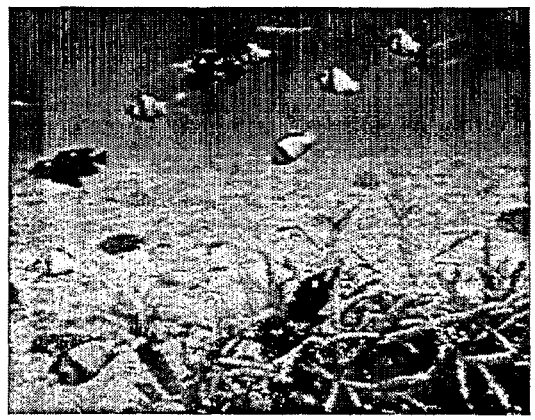
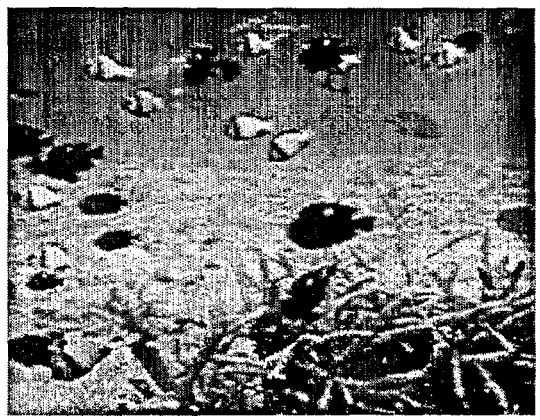
FIG. 9a FIG. 9b
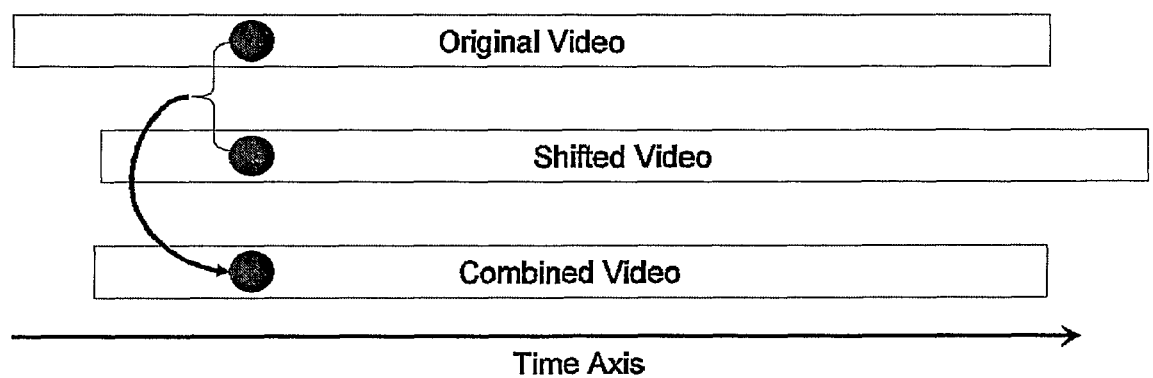
FIG. 10

METHOD AND SYSTEM FOR PRODUCING A VIDEO SYNOPSIS

CROSS-REFERENCE TO RELATED APPLICATION

This application claims the benefit of U.S. provisional application Ser. No. 60/736,313 filed Nov. 15, 2005 and U.S. provisional application Ser. No. 60/759,044 Jan. 17, 2006.

RELATED APPLICATIONS

This application is a continuation-in-part application of U.S. Ser. No. 10/556,601 (Peleg et al.) "Method and system for spatio-temporal video warping" filed Nov. 2, 2006 and corresponding to WO2006/048875 published May 11, 2006 and further claims benefit of provisional application Ser. Nos. 60/736,313 filed Nov. 15, 2005 and 60/759,044 filed Jan. 17, 2006 all of whose contents are included herein by reference.

FIELD OF THE INVENTION

This invention relates generally to image and video based rendering, where new images and videos are created by combining portions from multiple original images of a scene. In particular, the invention relates to such a technique for the purpose of video abstraction or synopsis.

PRIOR ART

Prior art references considered to be relevant as a background to the invention are listed below and their contents are incorporated herein by reference. Additional references are mentioned in the above-mentioned U.S. provisional applications Nos. 60/736,313 and 60/759,044 and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] A. Agarwala, M. Dontcheva, M. Agrawala, S. Drucker, A. Colburn, B. Curless, D. Salesin, and M. Cohen. *Interactive digital photomontage*. In SIGGRAPH, pages 294-302, 2004.

[2] A. Agarwala, K. C. Zheng, C. Pal, M. Agrawala, M. Cohen, B. Curless, D. Salesin, and R. Szeliski. *Panoramic video textures*. In SIGGRAPH, pages 821-827, 2005.

[3] J. Assa, Y. Caspi, and D. Cohen-Or. Action synopsis: *Pose selection and illustration*. In SIGGRAPH, pages 667-676, 2005.

[4] O. Boiman and M. Irani. *Detecting irregularities in images and in video*. In ICCV, pages I: 462-469, Beijing, 2005.

[5] A. M. Ferman and A. M. Tekalp. *Multiscale content extraction and representation for video indexing*. Proc. of SPIE, 3229:23-31, 1997.

[6] M. Irani, P. Anandan, J. Bergen, R. Kumar, and S. Hsu. *Efficient representations of video sequences and their applications*. Signal Processing: Image Communication, 8(4):327-351, 1996.

[7] C. Kim and J. Hwang. *An integrated scheme for object-based video abstraction*. In ACM Multimedia, pages 303-311, New York, 2000.

[8] S. Kirkpatrick, C. D. Gelatt, and M. P. Vecchi. *Optimization by simulated annealing*. Science, 4598(13):671-680, 1983.

[9] V. Kolmogorov and R. Zabih. *What energy functions can be minimized via graph cuts?* In ECCV, pages 65-81, 2002.

[10] Y. Li, T. Zhang, and D. Tretter. *An overview of video abstraction techniques*. Technical Report HPL-2001-191, HP Laboratory, 2001.

[11] J. Oh, Q. Wen, J. lee, and S. Hwang. *Video abstraction*. In S. Deb, editor, Video Data Management and Information Retrieval, pages 321-346. Idea Group Inc. and IRM Press, 2004.

[12] C. Pal and N. Jojic. *Interactive montages of sprites for indexing and summarizing security video*. In Video Proceedings of CVPR05, page II: 1192, 2005.

[13] A. Pope, R. Kumar, H. Sawhney, and C. Wan. Video abstraction: *Summarizing video content for retrieval and visualization*. In Signals, Systems and Computers, pages 915-919, 1998.

[14] WO2006/048875 Method and system for spatio-temporal video warping, pub. May 11, 2006 by S. Peleg, A. Rav-Acha and D. Lischinski. This corresponds to U.S. Ser. No. 10/556,601 filed Nov. 2, 2005.

[15] A. M. Smith and T. Kanade. *Video skimming and characterization through the combination of image and language understanding*. In CAIVD, pages 61-70, 1998.

[16] A. Stefanidis, P. Partsinevelos, P. Agouris, and P. Doucette. *Summarizing video datasets in the spatiotemporal domain*. In DEXA Workshop, pages 906-912, 2000.

[17] H. Zhong, J. Shi, and M. Visontai. *Detecting unusual activity in video*. In CVPR, pages 819-826, 2004.

[18] X. Zhu, X. Wu, J. Fan, A. K. Elmagarmid, and W. G. Aref. *Exploring video content structure for hierarchical summarization*. Multimedia Syst., 10(2):98-115, 2004.

[19] J. Barron, D. Fleet, S. Beauchemin and T. Burkitt. *Performance of optical flow techniques*. volume 92, pages 236-242.

[20] V. Kwatra, A. Schödl, I. Essa, G. Turk and A. Bobick. *Graphcut textures: image and video synthesis using graph cuts*. In SIGGRAPH, pages 227-286, July 2003.

[21] C. Kim and J. Hwang, Fast and Automatic Video Object Segmentation and Tracking for Content-Based Applications, IEEE Transactions on Circuits and Systems for Video Technology, Vol. 12, No. 2, February 2002, pp 122-129.

[22] U.S. Pat. No. 6,665,003

BACKGROUND OF THE INVENTION

Video synopsis (or abstraction) is a temporally compact representation that aims to enable video browsing and retrieval.

There are two main approaches for video synopsis. In one approach, a set of salient images (key frames) is selected from the original video sequence. The key frames that are selected are the ones that best represent the video [7, 18]. In another approach a collection of short video sequences is selected [15]. The second approach is less compact, but gives a better impression of the scene dynamics. Those approaches (and others) are described in comprehensive surveys on video abstraction [10, 11].

In both approaches above, entire frames are used as the fundamental building blocks. A different methodology uses mosaic images together with some meta-data for video indexing [6, 13, 12]. In this methodology the static synopsis image includes objects from different times.

Object-based approaches are also known in which objects are extracted from the input video [7, 5, 16]. However, these methods use object detection for identifying significant key frames and do not combine activities from different time intervals.

Methods are also known in the art for creating a single panoramic image using iterated min-cuts [1] and for creating a panoramic movie using iterated min-cuts [2]. In both methods, a problem with exponential complexity (in the number of input frames) is approximated and therefore they are more appropriate to a small number of frames. Related work in this field is associated with combining two movies using min-cut [20].

WO2006/048875[14] discloses a method and system for manipulating the temporal flow in a video. A first sequence of video frames of a first dynamic scene is transformed to a second sequence of video frames depicting a second dynamic scene such that in one aspect, for at least one feature in the first dynamic scene respective portions of the first sequence of video frames are sampled at a different rate than surrounding portions of the first sequence of video frames; and the sampled portions are copied to a corresponding frame of the second sequence. This allows the temporal synchrony of features in a dynamic scene to be changed.

SUMMARY OF THE INVENTION

According to a first aspect of the invention there is provided a computer-implemented method for transforming a first sequence of video frames of a first dynamic scene to a second sequence of at least two video frames depicting a second dynamic scene, the method comprising:
(a) obtaining a subset of video frames in said first sequence that show movement of at least one object comprising a plurality of pixels located at respective x, y coordinates;
(b) selecting from said subset portions that show non-spatially overlapping appearances of the at least one object in the first dynamic scene; and
(c) copying said portions from at least three different input frames to at least two successive frames of the second sequence without changing the respective x, y coordinates of the pixels in said object and such that at least one of the frames of the second sequence contains at least two portions that appear at different frames in the first sequence According to a second aspect of the invention there is provided a system for transforming a first sequence of video frames of a first dynamic scene to a second sequence of at least two video frames depicting a second dynamic scene, the system comprising:
a first memory for storing a subset of video frames in said first sequence that show movement of at least one object comprising a plurality of pixels located at respective x, y coordinates,
a selection unit coupled to the first memory for selecting from said subset portions that show non-spatially overlapping appearances of the at least one object in the first dynamic scene,
a frame generator for copying said portions from at least three different input frames to at least two successive frames of the second sequence without changing the respective x, y coordinates of the pixels in said object and such that at least one of the frames of the second sequence contains at least two portions that appear at different frames in the first sequence, and
a second memory for storing frames of the second sequence.

The invention further comprises in accordance with a third aspect a data carrier tangibly embodying a sequence of output video frames depicting a dynamic scene, at least two successive frames of said output video frames comprising a plurality of pixels having respective x, y coordinates and being derived from portions of an object from at least three different input frames without changing the respective x, y coordinates of the pixels in said object and such that at least one of the output video frames contains at least two portions that appear at different input frames.

The dynamic video synopsis disclosed by the present invention is different from previous video abstraction approaches reviewed above in the following two properties: (i) The video synopsis is itself a video, expressing the dynamics of the scene. (ii) To reduce as much spatio-temporal redundancy as possible, the relative timing between activities may change.

As an example, consider the schematic video clip represented as a space-time volume in FIG. 1. The video begins with a person walking on the ground, and after a period of inactivity a bird is flying in the sky. The inactive frames are omitted in most video abstraction methods. Video synopsis is substantially more compact, by playing the person and the bird simultaneously. This makes an optimal use of image regions by shifting events from their original time interval to another time interval when no other activity takes place at this spatial location. Such manipulations relax the chronological consistency of events as was first presented in [14].

The invention also presents a low-level method to produce the synopsis video using optimizations on Markov Random Fields [9].

One of the options provided by the invention is the ability to display multiple dynamic appearances of a single object. This effect is a generalization of the "strobo-scopic" pictures used in traditional video synopsis of moving objects [6, 1]. Two different schemes for doing this are presented. In a first scheme, snapshots of the object at different instances of time are presented in the output video so as to provide an indication of the object's progress throughout the video from a start location to an end location. In a second scheme, the object has no defined start or end location but moves randomly and unpredictably. In this case, snapshots of the object at different instances of time are again presented in the output video but this time give the impression of a greater number of objects increased than there actually are. What both schemes share in common is that multiple snapshots taken at different times from an input video are copied to an output video in such a manner as to avoid spatial overlap and without copying from the input video data that does not contribute to the dynamic progress of objects of interest.

Within the context of the invention and the appended claims, the term "video" is synonymous with "movie" in its most general term providing only that it is accessible as a computer image file amenable to post-processing and includes any kind of movie file e.g. digital, analog. The camera is preferably at a fixed location by which is meant that it can rotate and zoom—but is not subjected translation motion as is done in hitherto-proposed techniques. The scenes with the present invention is concerned are dynamic as opposed, for example, to the static scenes processed in U.S. Pat. No. 6,665,003 [22] and other references directed to the display of stereoscopic images which does not depict a dynamic scene wherein successive frames have spatial and temporal continuity. In accordance with one aspect of the invention, we formulate the problem as a single min-cut problem that can be solved in polynomial time by finding a maximal flow on a graph [5].

In order to describe the invention use will be made of a construct that we refer to as the "space-time volume" to create the dynamic panoramic videos. The space-time volume may be constructed from the input sequence of images by sequentially stacking all the frames along the time axis. However, it is to be understood that so far as actual implementation is concerned, it is not necessary actually to construct the space-time volume for example by actually stacking in time 2D frames of a dynamic source scene. More typically, source frames are processed individually to construct target frames but it will aid understanding to refer to the space time volume as though it is a physical construct rather than a conceptual construct.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 5a, 5b and 5c are pictorial representations showing an example when a short synopsis can describe a longer sequence with no loss of activity and without the stroboscopic effect;

FIG. 9 is a pictorial representation showing increasing activity density of a movie according to a further embodiment of the invention;

FIG. 10 is a schematic diagram of the process used to generate the movie shown in FIG. 9;

DETAILED DESCRIPTION OF EMBODIMENTS

1. Activity Detection

Figure 1:
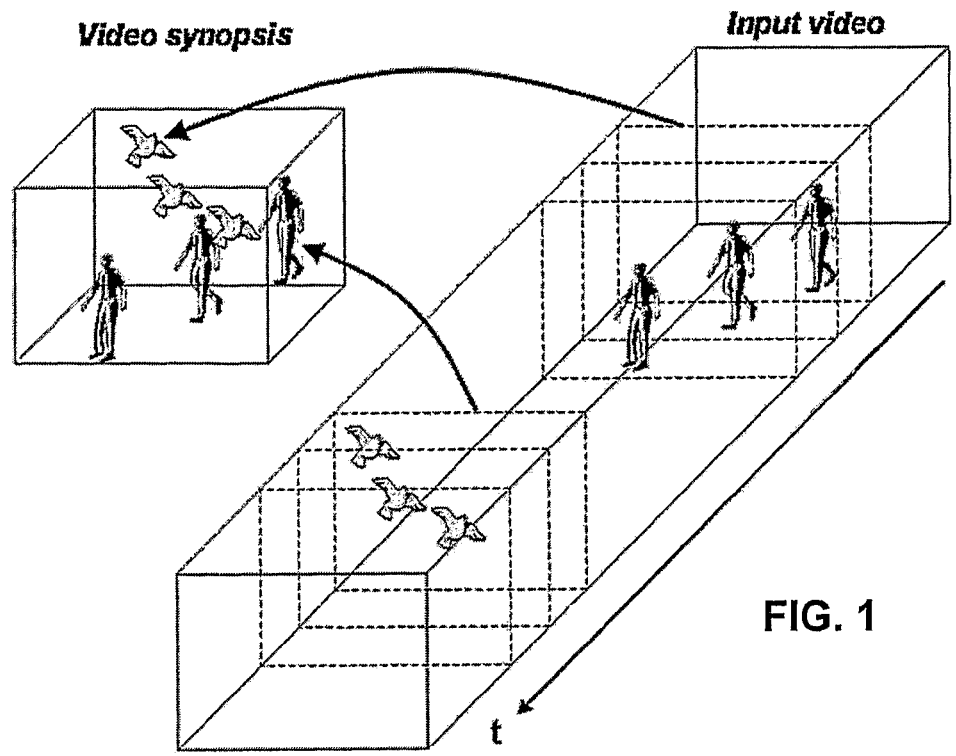
FIG. 1 is a pictorial representation showing the approach of this invention to producing a compact video synopsis by playing temporally displaced features simultaneously.

The invention assumes that every input pixel has been labeled with its level of "importance". While from now on we will use for the level of "importance" the activity level, it is clear that any other measure can be used for "importance" based on the required application. Evaluation of the importance (or activity) level is assumed and is not itself a feature of the invention. It can be done using one of various methods for detecting irregularities [4, 17], moving object detection, and object tracking. Alternatively, it can be based on recognition algorithms, such as face detection.

By way of example, a simple and commonly used activity indicator may be selected, where an input pixel $I(x,y,t)$ is labeled as "active" if its color difference from the temporal median at location $(x,y)$ is larger than a given threshold. Active pixels are defined by the characteristic function:

$$\chi(p) = \begin{cases} 1 & \text{if } p \text{ is active} \\ 0 & \text{otherwise,} \end{cases}$$

To clean the activity indicator from noise, a median filter is applied to $\chi$ before continuing with the synopsis process.

While it is possible to use a continuous activity measure, the inventors have concentrated on the binary case. A continuous activity measure can be used with almost all equations in the following detailed description with only minor changes [4, 17, 1].

We describe two different embodiments for the computation of video synopsis. One approach (Section 2) uses graph representation and optimization of cost function using graph-cuts. Another approach (Section 3) uses object segmentation and tracking.

2. Video Synopsis by Energy Minimization

Let N frames of an input video sequence be represented in a 3D space-time volume $I(x,y,t)$, where $(x,y)$ are the spatial coordinates of this pixel, and $1 \leq t \leq N$ is the frame number.

We would like to generate a synopsis video $S(x,y,t)$ having the following properties:

a The video synopsis S should be substantially shorter than the original video I.

Maximum "activity" from the original video should appear in the synopsis video.

The motion of objects in the video synopsis should be similar to their motion in the original video.

The video synopsis should look good, and visible seams or fragmented objects should be avoided.

The synopsis video S having the above properties is generated with a mapping M, assigning to every coordinate $(x,y,t)$ in the synopsis S the coordinates of a source pixel from I. We focus on time shift of pixels, keeping the spatial locations fixed. Thus, any synopsis pixel $S(x,y,t)$ can come from an input pixel $I(x,y,M(x,y,t))$. The time shift M is obtained by solving an energy minimization problem, where the cost function is given by $$E(M) = E_a(M) + \alpha E_d(M), \qquad (1)$$

where $E_a(M)$ indicates the loss in activity, and $E_d(M)$ indicates the discontinuity across seams. The loss of activity will be the number of active pixels in the input video I that do not appear in the synopsis video S, $$E_a(M) = \sum_{(x,y,t) \in I} \chi(x,y,t) - \sum_{(x,y,t) \in S} \chi(x,y,M(x,y,t)). \qquad (2)$$

The discontinuity cost $E_d$ is defined as the sum of color differences across seams between spatiotemporal neighbors in the synopsis video and the corresponding neighbors in the input video (A similar formulation can be found in [1]):

$$E_d(M) = \sum_{(x,y,t) \in S} \sum_i \|S((x,y,t) + e_i) - I((x,y,M(x,y,t)) + e_i\|^2 \qquad (3)$$

where $e_i$ are the six unit vectors representing the six spatio-temporal neighbors.

Figures 2A, 2B:
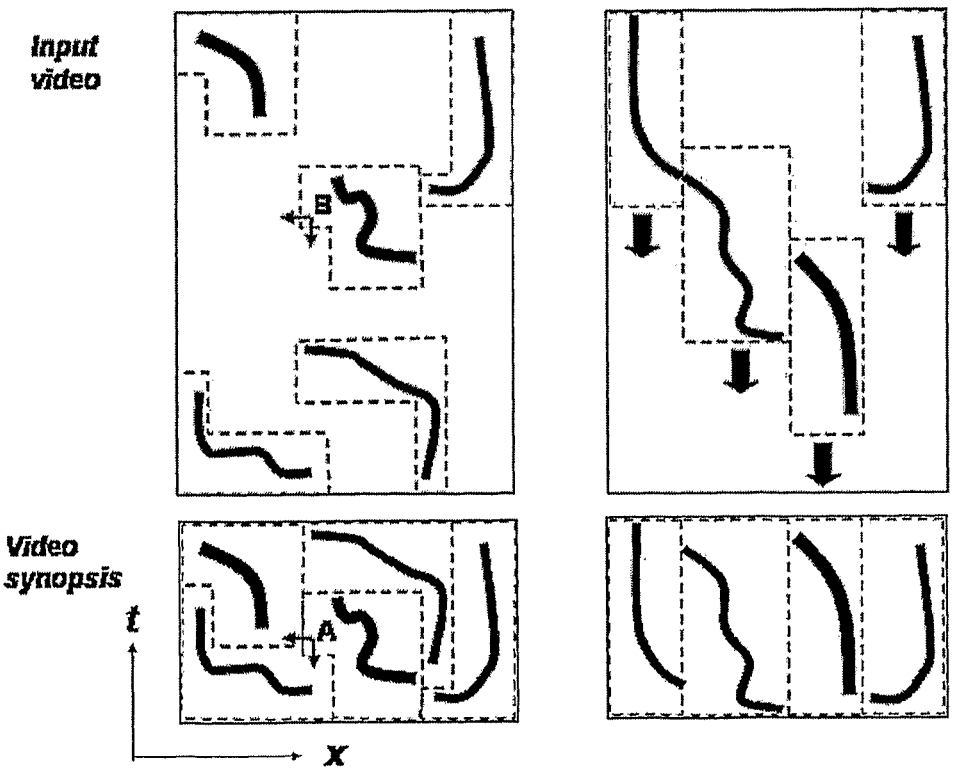
FIGS. 2a and 2b are schematic representations depicting video synopses generated according to the invention.

FIGS. 2a and 2b are schematic representations depicting space-time operations that create a short video synopsis by minimizing the cost function where the movement of moving objects is depicted by "activity strips" in the figures. The upper part represents the original video, while the lower part represents the video synopsis. Specifically, in FIG. 2a the shorter video synopsis S is generated from the input video 1 by including most active pixels. To assure smoothness, when pixel A in S corresponds to pixel B in 1, their "cross border" neighbors should be similar. Finding the optimal M minimizing (3) is a very large optimization problem. An approximate solution is shown in FIG. 2b where consecutive pixels in the synopsis video are restricted to come from consecutive input pixels.

Notice that the cost function E(M) (Eq. 1) corresponds to a 3D Markov random field (MRF) where each node corresponds to a pixel in the 3D volume of the output movie, and can be assigned any time value corresponding to an input frame. The weights on the nodes are determined by the activity cost, while the edges between nodes are determined according to the discontinuity cost. The cost function can therefore be minimized by algorithms like iterative graph-cuts [9].

2.1. Restricted Solution Using a 2D Graph

The optimization of Eq. (1), allowing each pixel in the video synopsis to come from any time, is a large-scale problem. For example, an input video of 3 minutes which is summarized into a video synopsis of 5 seconds results in a graph with approximately $2^{25}$ nodes, each having 5400 labels.

It was shown in [2] that for cases of dynamic textures or objects that move in horizontal path, 3D MRFs can be solved efficiently by reducing the problem into a 1D problem. In this work we address objects that move in a more general way, and therefore we use different constraints. Consecutive pixels in the synopsis video S are restricted to come from consecutive pixels in the input video I. Under this restriction the 3D graph is reduced to a 2D graph where each node corresponds to a spatial location in the synopsis movie. The label of each node M(x,y) determines the frame number t in I shown in the first frame of S, as illustrated in FIG. 2b. A seam exists between two neighboring locations $(x_1, y_1)$ and $(x_2, y_2)$ in S if $M(x_1, y_1) \neq M(x_2, y_2)$, and the discontinuity cost $E_d(M)$ along the seam is a sum of the color differences at this spatial location over all frames in S.

$$E_d(M) = \sum_{x,y} \sum_i \sum_{t=1}^{K} \|S((x, y, t) + e_i) - I((x, y, M(x, y) + t) + e_i)\|^2 \quad (4)$$

where $e_i$ are now four unit vectors describing the four spatial neighbors.

The number of labels for each node is N–K, where N and K are the number of frames in the input and output videos respectively. The activity loss for each pixel is:

$$E_a(M) = \sum_{x,y} \left( \sum_{t=1}^{N} \chi(x, y, t) - \sum_{t=1}^{K} \chi(x, y, M(x, y) + t) \right)$$

3. Object-Based Synopsis

The low-level approach for dynamic video synopsis as described earlier is limited to satisfying local properties such as avoiding visible seams. Higher level object-based properties can be incorporated when objects can be detected. For example, avoiding the stroboscopic effect requires the detection and tracking of each object in the volume. This section describes an implementation of object-based approach for dynamic video synopsis. Several object-based video summary methods exist in the literature (for example [7, 5, 16]), and they all use the detected objects for the selection of significant frames. Unlike these methods, the invention shifts objects in time and creates new synopsis frames that never appeared in the input sequence in order to make a better use of space and time.

In one embodiment moving objects are detected as described above by comparing each pixel to the temporal median and thresholding this difference. This is followed by noise cleaning using a spatial median filter, and by grouping together spatio-temporal connected components. It should be appreciated that there are many other methods in the literature for object detection and tracking that can be used for this task (E.g. [7, 17, 21]. Each process of object detection and tracking results in a set of objects, where each object b is represented by its characteristic function $$\chi_b(x, y, t) = \begin{cases} 1 & \text{if } (x, y, t) \in b \\ 0 & \text{otherwise,} \end{cases} \quad (5)$$

Figures 3A, 3B, 3C:
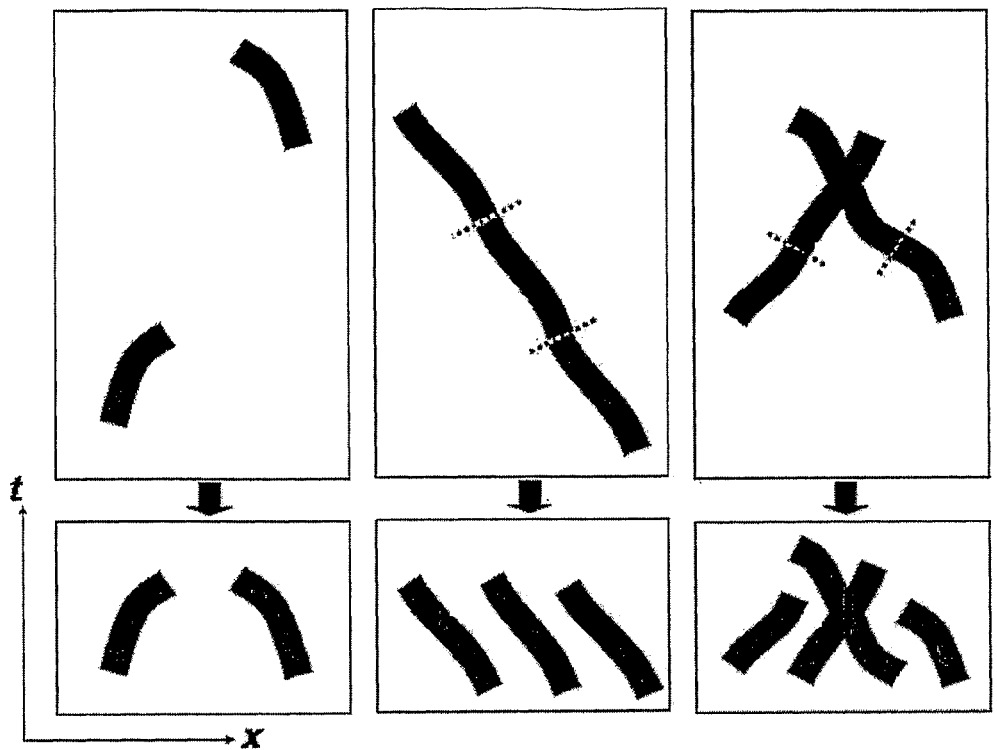
FIGS. 3a, 3b and 3c are pictorial representations showing examples of temporal re-arrangement according to the invention.

FIGS. 3a, 3b and 3c are pictorial representations showing examples of temporal re-arrangement according to the invention. The upper parts of each figure represent the original video, and the lower parts represent the video synopsis where the movement of moving objects is depicted by the "activity strips" in the figures. FIG. 3a shows two objects recorded at different times shifted to the same time interval in the video synopsis. FIG. 3b shows a single object moving during a long period broken into segments having shorter time intervals, which are then played simultaneously creating a dynamic stroboscopic effect. FIG. 3c shows that intersection of objects does not disturb the synopsis when object volumes are broken into segments.

From each object, segments are created by selecting subsets of frames in which the object appears. Such segments can represent different time intervals, optionally taken at different sampling rates.

Figure 4:
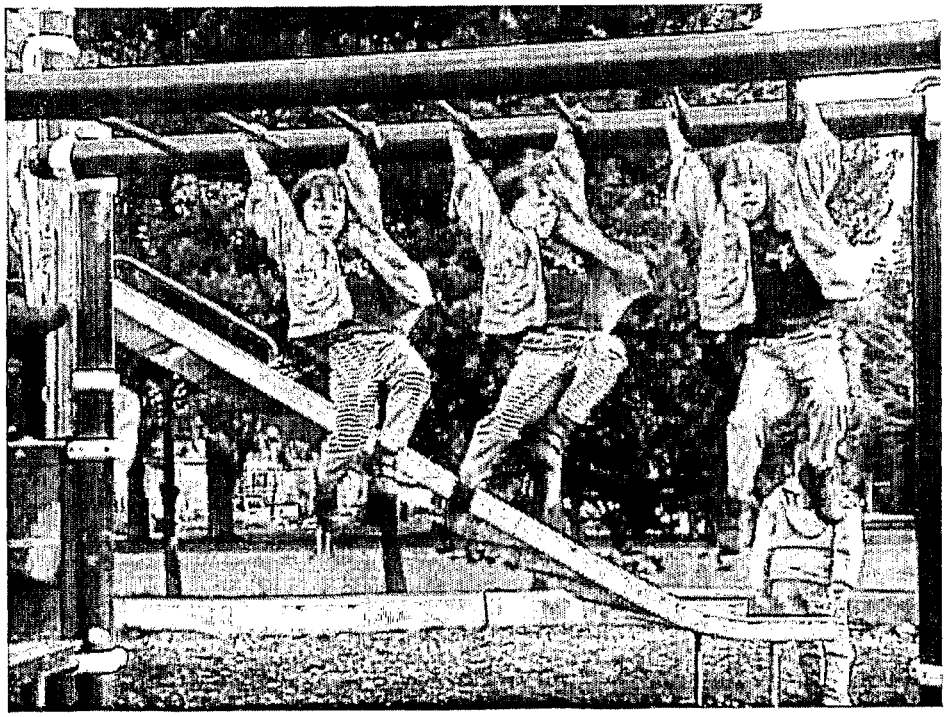
FIG. 4 is a pictorial representation showing a single frame of a video synopsis using a dynamic stroboscopic effect depicted in FIG. 3b.

The video synopsis S will be constructed from the input video I using the following operations:
(1) Objects $b_1 \ldots b_r$ are extracted from the input video I.
(2) A set of non-overlapping segments B is selected from the original objects.
(3) A temporal shift M is applied to each selected segment, creating a shorter video synopsis while avoiding occlusions between objects and enabling seamless stitching. This is explained in FIG. 1 and FIG. 3a to 3c. FIG. 4 is a pictorial representation showing an example where a single frame of a video synopsis using a dynamic stroboscopic effect as depicted in FIG. 3b.

Operations (2) and (3) above are inter-related, as we would like to select the segments and shift them in time to obtain a short and seamless video synopsis. It should be appreciated that the operation in (2) and (3) above do not need to be perfect. When we say "non-overlapping segments" a small overlap may be allowed, and when we say "avoiding occlusion" a small overlap between objects shifted in time may be allowed but should be minimized in order to get a visually appealing video.

In the object based representation, a pixel in the resulting synopsis may have multiple sources (coming from different objects) and therefore we add a post-processing step in which all objects are stitched together. The background image is generated by taking a pixel's median value over all the frames of the sequence. The selected objects can then be blended in, using weights proportional to the distance (in RGB space) between the pixel value in each frame and the median image. This stitching mechanism is similar to the one used in [6].

We define the set of all pixels which are mapped to a single synopsis pixel $(x,y,t) \in S$ as $src(x,y,t)$, and we denote the number of (active) pixels in an object (or a segment) b as $\#b = \Sigma_{x,y,t \in 1} \chi_b(x,y,t)$.

We then define an energy function which measures the cost for a subset selection of segments B and for a temporal shift M. The cost includes an activity loss $E_a$, a penalty for occlusions between objects $E_o$ and a term $E_l$ penalizing long synopsis videos:

$$E(M, B) = E_a + \alpha E_o + \beta E_l \quad (6)$$

where $$E_a = \sum_b \#b - \sum_{b \in B} \#b \quad (7)$$

$$E_o = \sum_{(x,y,t) \in S} \text{Var}\{src(x, y, t)\}$$

$$E_l = \text{length}(S)$$

3.1. Video-Synopsis with a Pre-Determined Length

We now describe the case where a short synopsis video of a predetermined length K is constructed from a longer video. In this scheme, each object is partitioned into overlapping and consecutive segments of length K. All the segments are time-shifted to begin at time t=1, and we are left with deciding which segments to include in the synopsis video. Obviously, with this scheme some objects may not appear in the synopsis video.

We first define an occlusion cost between all pairs of segments. Let $b_i$ and $b_j$ be two segments with appearance times $t_i$ and $t_j$, and let the support of each segment be represented by its characteristic function $\chi$ (as in Eq. 5).

The cost between these two segments is defined to be the sum of color differences between the two segments, after being shifted to time t=1.

$$v(b_i, b_j) = \sum_{x,y,t \in S} (I(x, y, t + t_i) - I(x, y, t + t_j))^2 \cdot \quad (8)$$

$$\chi_{b_i}(x, t, t + t_i) \cdot \chi_{b_j}(x, t, t + t_j)$$

For the synopsis video we select a partial set of segments B which minimizes the cost in Eq. 6 where now $E_l$ is constant K, and the occlusion cost is given by $$E_o(B) = \sum_{i,j \in B} v(b_i, b_j) \quad (9)$$

To avoid showing the same spatio-temporal pixel twice (which is admissible but wasteful) we set $v(b_i, b_j) = \infty$ for segments $b_i$ and $b_j$ that intersect in the original movie. In addition, if the stroboscopic effect is undesirable, it can be avoided by setting $v(b_i, b_j) = \infty$ for all $b_i$ and $b_j$ that were sampled from the same object.

Simulated Annealing [8] is used to minimize the energy function. Each state describes the subset of segments that are included in the synopsis, and neighboring states are taken to be sets in which a segment is removed, added or replaced with another segment.

After segment selection, a synopsis movie of length K is constructed by pasting together all the shifted segments. An example of one frame from a video synopsis using this approach is given in FIG. 4.

3.2. Lossless Video Synopsis

For some applications, such as video surveillance, we may prefer a longer synopsis video, but in which all activities are guaranteed to appear. In this case, the objective is not to select a set of object segments as was done in the previous section, but rather to find a compact temporal re-arrangement of the object segments.

Again, we use Simulated Annealing to minimize the energy. In this case, a state corresponds to a set of time shifts for all segments, and two states are defined as neighbors if their time shifts differ for only a single segment. There are two issues that should be noted in this case:

Object segments that appear in the first or last frames should remain so in the synopsis video; (otherwise they may suddenly appear or disappear). We take care that each state will satisfy this constraint by fixing the temporal shifts of all these objects accordingly.

The temporal arrangement of the input video is commonly a local minimum of the energy function, and therefore is not a preferable choice for initializing the Annealing process. We initialized our Simulated Annealing with a shorter video, where all objects overlap.

Figure 5C:
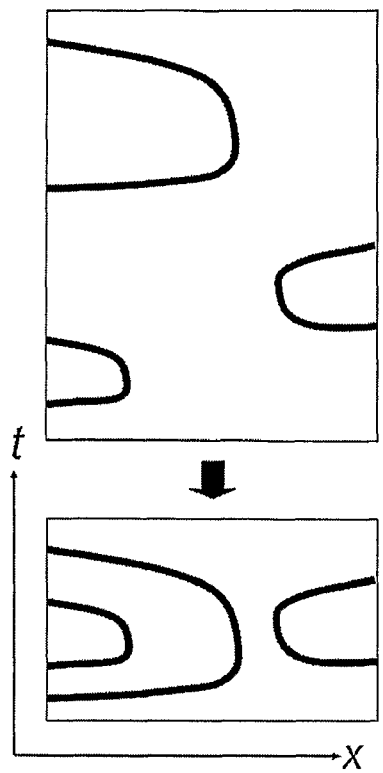

FIGS. 5a, 5b and 5c are pictorial representations showing an example of this approach when a short synopsis can describe a longer sequence with no loss of activity and without the stroboscopic effect. Three objects can be time shifted to play simultaneously. Specifically, FIG. 5a depicts the schematic space-time diagram of the original video (top) and the video synopsis (bottom). FIG. 5b depicts three frames from the original video; as seen from the diagram in FIG. 5a, in the original video each person appears separately, but in the synopsis video all three objects may appear together. FIG. 5c depicts one frame from the synopsis video showing all three people simultaneously.

4. Panoramic Video Synopsis

When a video camera is scanning a scene, much redundancy can be eliminated by using a panoramic mosaic. Yet, existing methods construct a single panoramic image, in which the scene dynamics is lost. Limited dynamics can be represented by a stroboscopic image [6, 1, 3], where moving objects are displayed at several locations along their paths.

Figure 6:
FIG. 6 is a pictorial representation showing a further example of a panoramic video synopsis according to the invention.

A panoramic synopsis video can be created by simultaneously displaying actions that took place at different times in different regions of the scene. A substantial condensation may be obtained, since the duration of activity for each object is limited to the time it is being viewed by the camera. A special case is when the camera tracks an object such as the running lioness shown in FIG. 6. When a camera tracks the running lioness, the synopsis video is a panoramic mosaic of the background, and the foreground includes several dynamic copies of the running lioness. In this case, a short video synopsis can be obtained only by allowing the Stroboscopic effect.

Constructing the panoramic video synopsis is done in a similar manner to the regular video synopsis, with a preliminary stage of aligning all the frames to some reference frame. After alignment, image coordinates of objects are taken from a global coordinate system, which may be the coordinate system of one of the input images.

In order to be able to process videos even when the segmentation of moving objects is not perfect, we have penalized occlusions instead of totally preventing them. This occlusion penalty enables flexibility in temporal arrangement of the objects, even when the segmentation is not perfect, and pixels of an object may include some background.

Additional term can be added, which bias the temporal ordering of the synopsis video towards the ordering of the input video.

Minimizing the above energy over all possible segment-selections B and a temporal shift M is very exhaustive due to the large number of possibilities. However, the problem can be scaled down significantly by restricting the solutions. Two restricted schemes are described in the following sections.

5. Surveillance Examples

An interesting application for video synopsis may be the access to stored surveillance videos. When it becomes necessary to examine certain events in the video, it can be done much faster with video synopsis.

Figure 5C:
Figure 5C:
Figure 7A:
FIGS. 7a, 7b and 7c are pictorial representations showing details of a video synopsis from street surveillance.
Figure 7B:
Figure 7C:

As noted above, FIG. 5 shows an example of the power of video synopsis in condensing all activity into a short period, without losing any activity. This was done using a video collected from a camera monitoring a coffee station. Two additional examples are given from real surveillance cameras. FIGS. 7a, 7b and 7c are pictorial representations showing details of a video synopsis from street surveillance. FIG. 7a shows a typical frame from the original video (22 seconds). FIG. 7b depicts a frame from a video synopsis movie (2 seconds) showing condensed activity. FIG. 7c depicts a frame from a shorter video synopsis (0.7 seconds), showing an even more condensed activity. The images shown in these figures were derived from a video captured by a camera watching a city street, with pedestrians occasionally crossing the field of view. Many of them can be collected into a very condensed synopsis.

Figure 8A:
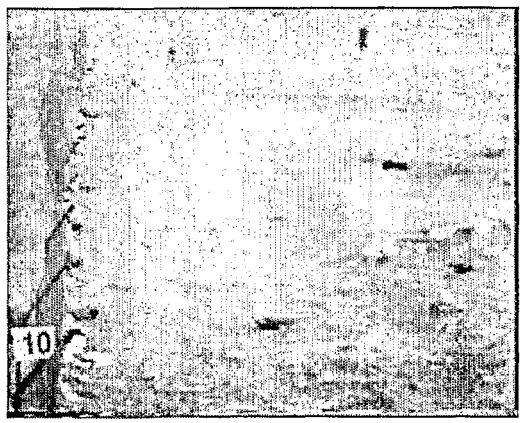
FIGS. 8a and 8b are pictorial representations showing details of a video synopsis from fence surveillance.
Figure 8B:

FIGS. 8a and 8b are pictorial representations showing details of a video synopsis from fence surveillance. There is very little activity near the fence, and from time to time we can see a soldier crawling towards the fence. The video synopsis shows all instances of crawling and walking soldiers simultaneously, or optionally making the synopsis video even shorter by playing it stroboscopically.

6. Video Indexing Through Video Synopsis

Video synopsis can be used for video indexing, providing the user with efficient and intuitive links for accessing actions in videos. This can be done by associating with every synopsis pixel a pointer to the appearance of the corresponding object in the original video. In video synopsis, the information of the video is projected into the "space of activities", in which only activities matter, regardless of their temporal context (although we still preserve the spatial context). As activities are concentrated in a short period, specific activities in the video can be accessed with ease.

It will be clear from the foregoing description that when a video camera is scanning a dynamic scene, the absolute "chronological time" at which a region becomes visible in the input video, is not part of the scene dynamics. The "local time" during the visibility period of each region is more relevant for the description of the dynamics in the scene, and should be preserved when constructing dynamic mosaics. The embodiments described above present a first aspect of the invention. In accordance with a second aspect, we will now show how to create seamless panoramic mosaics, in which the stitching between images avoids as much as possible cutting off parts from objects in the scene, even when these objects may be moving.

7. Creating Panoramic Image using a 3D Min-Cut

Let $I_1, \ldots, I_N$ be the frames of the input sequence. We assume that the sequence was aligned to a single reference frame using one of the existing methods. For simplicity, we will assume that all the frames after alignment are of the same size (pixels outside the field of view of the camera will be marked as non-valid.) Assume also that the camera is panning clockwise. (Different motions can be handled in a similar manner).

Let $P(x,y)$ be the constructed panoramic image. For each pixel $(x,y)$ in P we need to choose the frame $M(x,y)$ from which this pixel is taken. (That is, if $M(x,y)=k$ then $P(x,y)=I_k(x,y)$). Obviously, under the assumption that the camera is panning clockwise, the left column must be taken from the first frame, while the right column must be taken from the last frame. (Other boundary conditions can be selected to produce panoramic images with a smaller field of view).

Our goal is to produce a seamless panoramic image. To do so, we will try to avoid stitching inside objects, particularly of they are moving. We use a seam score similar to the score used by [1], but instead of solving (with approximation) a NP-hard problem, we will find an optimal solution for a more restricted problem:

8. Formulating the Problem as an Energy Minimization Problem

The main difference from previous formulations is our stitching cost, defined by:

$$E_{stitch}(x, y, x', y') = \sum_{k=minM}^{maxM-1} \frac{1}{2}\|I_k(x, y) - I_{k+1}(x, y)\|^2 + \frac{1}{2}\|I_k(x', y') - I_{k+1}(x', y')\|^2 \quad (10)$$

where:
minM=min(M(x,y),M(x',y'))
maxM=max(M(x,y),M(x',y'))

This cost is reasonable assuming that the assignment of the frames is continuous, which means that if $(x,y)$ and $(x',y')$ are neighboring pixels, their source frames $M(x,y)$ and $M(x',y')$ are close. The main advantage of this cost is that it allows us to solve the problem as a min-cut problem on a graph.

The energy function we will minimize is:

$$E(M) = \sum_{(x,y)} \sum_{(x',y') \in N(x,y)} E_{stitch}(x, y, x', y') + \sum_{(x,y)} (1 - \text{Valid}(x, y, M(x, y)) \cdot D, \quad (11)$$

where:
N(x,y) are the pixels in the neighborhood of (x,y).
E(x,y,x',y') is the stitching cost for each neighboring pixels, as described in Eq. 1.
Valid (x,y,k) is $1 \iff I_k(x,y)$ is a valid pixel (i.e.—in the field of view of the camera).
D is a very large number (standing for infinity).

9. Building a Single Panorama

We next show how to convert the 2D multi-label problem (which has exponential complexity) into a 3D binary one (which has polynomial complexity, and practically can be solved quickly). For each pixel x,y and input frame k we define a binary variable $b(x,y,k)$ that equals to one iff $M(x,y) \leq k$. ($M(x,y)$ is the source frame of the pixel $(x,y)$). Obviously, $b(x,y,N)=1$.

Note that given $b(x,y,k)$ for each $1 \leq k \leq N$, we can determine $M(x,y)$ as the minimal k for which $b(x,y,k)=1$. We will write an energy term whose minimization will give a seamless panorama. For each adjacent pixels (x,y) and (x',y') and for each k, we add the error term:

$$\|I_k(x,y)-I_{k+1}(x,y)\|^2+\|I_k(x',y')-I_{k+1}(x',y')\|^2$$

for assignments in which b(x,y,k)≠b(x',y',k). (This error term is symmetrical).

We also add an infinite penalty for assignments in which b(x,y,k)=1 but b(x,y,k+1)=0. (As it is not possible that M(x,y)<=k but M(x,y)>k).

Finally, if $I_k(x,y)$ is a non valid pixel, we can avoid choosing this pixel by giving an infinite penalty to the assignments b(x,y,k)=1^b(x,y,k+1)=0 if k>1 or b(x,y,k)=1 of k=1. (These assignments implies that M(x,y)=k).

All the terms above are on pairs of variables in a 3D grid, and therefore we can describe as minimizing an energy function on a 3D binary MRF, and minimize it in polynomial time using min-cut [9].

10. Creating Panoramic Movie Using a 4D Min-Cut

To create a panoramic movie (of length L), we have to create a sequence of panoramic images. Constructing each panoramic image independently is not good, as no temporal consistency is enforced. Another way is to start with an initial mosaic image as the first frame, and for the consecutive mosaic images take each pixel from the consecutive frame used from the previous mosaic ($M_l(x,y)=M(x,y)+l$). This possibility is similar to the one that has been described above with reference to FIG. 2b of the drawings.

In accordance with the second aspect of the invention, we use instead a different formulation, that gives the stitching an opportunity to change from one panoramic frame to another, which is very important to successfully stitch moving objects.

We construct a 4D graph which consists of L instances of the 3D graph described before:

$$b(x,y,k,l)=1 \Longleftrightarrow M_l(x,y) \leq k.$$

To enforce temporal consistency, we give infinite penalty to the assignments b(x,y,N,l)=1 for each l<L, and infinite penalty for the assignments b(x,y,k,l)=0 for each l>1.

In addition, for each (x,y,k,l) (1≦l≦L−1,1≦k≦N−1) we set the cost function:

$$E_{temp} = \frac{1}{2}\|I_k(x,y) - I_{k+1}(x,y)\|^2 + \frac{1}{2}\|I_{k+1}(x,y) - I_{k+2}(x,y)\|^2 \quad (12)$$

for the assignments b(x,y,k,l)=1≠b(x,y,k+1,l+1). (For k=N−1 we use only the left term of the cost). This cost encourages displaying (temporal) consecutive pixels in the resulting movie (unless, for example, these pixels are in the background).

A variant of this method is to connect each pixel (x,y) not to the same pixel at the consecutive frame, but to the corresponding pixel (x+u, y+v) according to the optical flow at that pixel (u,v). Suitable methods to compute optical flow can be found, for example, in [19]. Using optical flow handles better the case of moving objects.

Again, we can minimize the energy function using a min-cut on the 4D graph, and the binary solution defines a panoramic movie which reduced stitching problems.

11. Practical Improvements

It might require a huge amount of memory to save the 4D graph. We therefore use several improvements that reduce both the memory requirements and the runtime of the algorithm:

As mentioned before, the energy can be minimized without explicitly saving vertices for non-valid pixels. The number of vertices is thus reduced to the number of pixels in the input video, multiplied by the number of frames in the output video.

Instead of solving for each frame in the output video, we can solve only for a sampled set of the output frames, and interpolate the stitching function between them. This improvement is based on the assumption that the motion in the scene is not very large.

We can constrain each pixel to come only from a partial set of input frames. This males sense especially for a sequence of frames taken from a video, where the motion between each pair of consecutive frames is very small. In this case, we will not lose a lot by sampling the set of source-frame for each pixel. But it is advisable to sample the source-frames in a consistent way. For example, if the frame k is a possible source for pixel (x,y) in the l-th output frame, then the k+1 frame should be a possible source-frame for pixel (x,y) in the l+1-th output frame.

We use a multi-resolution framework (as was done for example in [2]), where a coarse solution is found for low resolution images (after blurring and sub-sampling), and the solution is refined only in the boundaries.

12. Combining Videos with Interest Score

We now describe a method for combining movies according to an interest score. There are several applications, such as creating a movie with denser (or sparser) activity, or even controlling the scene in a user specified way.

The dynamic panorama described in [14] can be considered as a special case, where different parts of the same movie are combined to obtain a movie with larger field of view: in this case, we have defined an interest score according to the "visibility" of each pixel in each time. More generally, combining different parts (shifts in time or space) of the same movie can be used in other cases. For example, to make the activity in the movie denser, we can combine different part of the movie where action occurs, to a new movie with a lot of action. The embodiment described above with reference to FIGS. 1 to 8 describes the special case of maximizing the activity, and uses a different methodology.

Two issues that should be addressed are:
1. How to combine the movies to a "good looking" movie. For example, we want to avoid stitching problems.
2. Maximizing the interest score.

We begin by describing different scores that can be used, and then describe the scheme used to combine the movies.

One of the main features that can be used as an interest function for movies is the "importance" level of a pixel. In our experiments we considered the "activity" in a pixel to indicates its importance, but other measures of importance are suitable as well. Evaluation of the activity level is not itself a feature of the present invention and can be done using one of various methods as referred to above in Section 1 (Activity Detection).

13. Other Scores

Other scores that can be used to combine movies:

Visibility Score: When the camera is moving, or if we try to fill a hole in a video, there are pixels that are not visible. We can penalize (not necessarily with an infinite score) non-valid pixels. In this way, we can encourage filling holes (or increasing the field of view), but may prefer not to fill the hole, or use smaller field of view if it results in bad stitching.

Orientation: The activity measure can be replaced with a directional one. For example, we might favor regions moving horizontally over regions moving vertically.

User specified: The user may specify a favorite interest function, such as color, texture, etc. In addition, the user can specify regions (and time slots) manually with different scores. For example, by drawing a mask where 1 denotes that maximal activity is desired, while 0 denotes that no activity is desired, the user can control the dynamics in the scene that is, to occur in a specific place.

14. The Algorithm

We use a similar method to the one used by [20], with the following changes:

We add an interest score for each pixel to be chosen from one movie or another. This score can be added using edges from each pixel of each movie to the terminal vertices (source and sink), and the weights in these edges are the interest scores.

We (optionally) compute optical flow between each consecutive pair of frames. Then, to enforce consistency, we can replace the edges between temporal neighbors ((x, y,t) to (x,y,t+1)) with edges between neighbors according to the optical flow ((x,y,t) to (x+u(x,y),y+v(x,y),t+ 1)). This enhances the transition between the stitched movies, as it encourages the stitch to follow the flow which is less noticeable.

One should consider not only the stitching cost but also the interest score when deciding which parts of a movie (or which movies) to combine. For example, when creating a movie with denser activity level, we choose a set of movies S that maximize the score:

$$\sum_{x,y,t} \bigcup_{b \in S} \chi_b(x, y, t)$$

FIG. 9b is a pictorial representation demonstrating this effect as increased activity density of a movie, an original frame from which is shown in FIG. 9a. When more than two movies are combined, we use an iterative approach, where in each iteration a new movie is combined into the resulting movie. To do so correctly, one should consider the old seams and scores that resulted from the previous iterations. This scheme, albeit without the interest scores, is described by [20]. A sample frame from the resulting video is shown in FIG. 9b.

FIG. 10 is a schematic diagram of the process. In this example, a video is combined with a temporally shifted version of itself. The combination is done using a min-cut according to the criteria described above, i.e. maximizing the interest score while minimizing the stitching cost.

Figure 11:
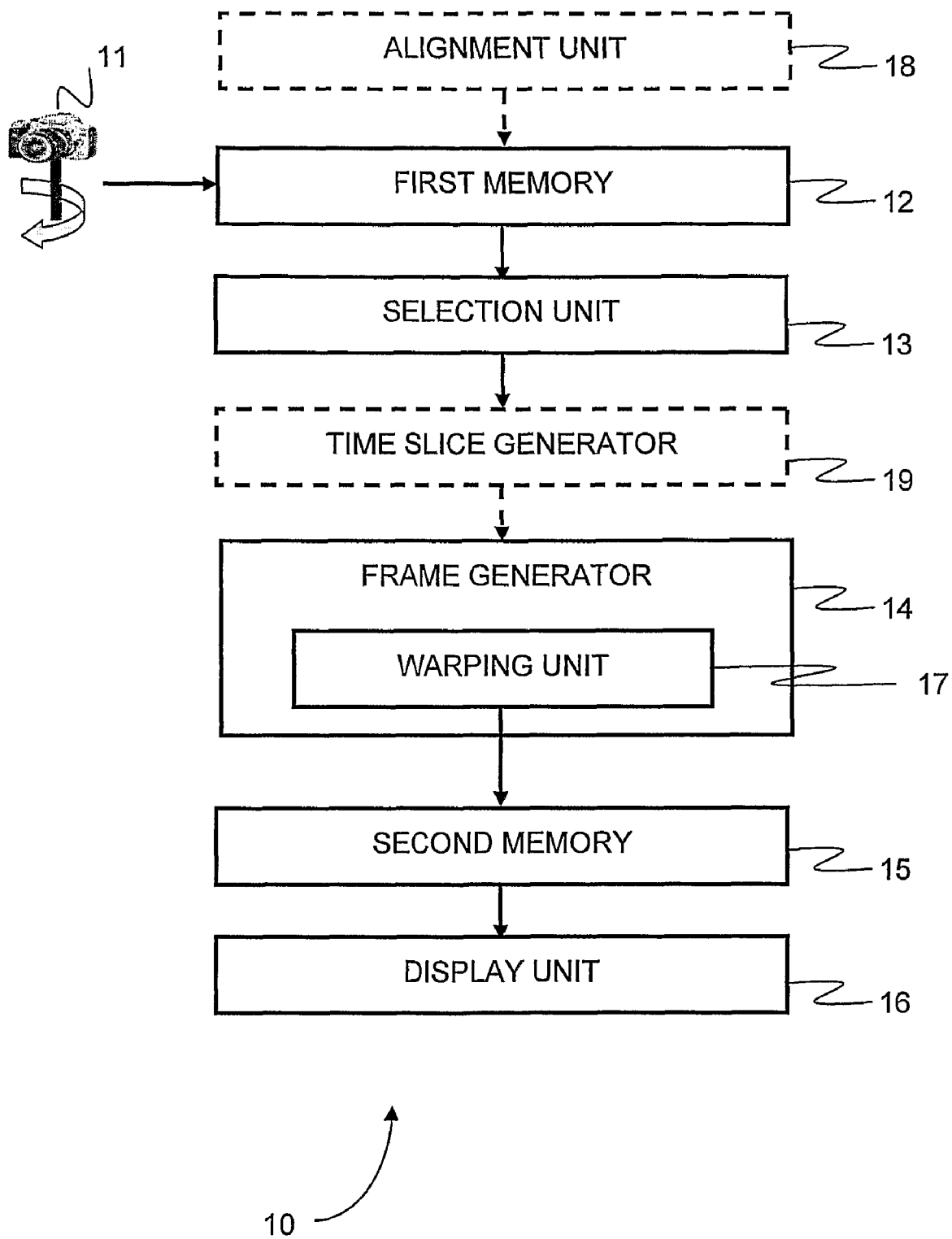
FIG. 11 is a block diagram showing the main functionality of a system according to the invention.

Referring now to FIG. 11, there is shown a block diagram of a system 10 according to the invention for transforming a first sequence of video frames of a first dynamic scene captured by a camera 11 to a second sequence of at least two video frames depicting a second dynamic scene. The system includes a first memory 12 for storing a subset of video frames in the first sequence that show movement of at least one object comprising a plurality of pixels located at respective x, y coordinates. A selection unit 13 is coupled to the first memory 12 for selecting from the subset portions that show non-spatially overlapping appearances of the at least one object in the first dynamic scene. A frame generator 14 copies the portions from at least three different input frames to at least two successive frames of the second sequence without changing the respective x, y coordinates of the pixels in the object and such that at least one of the frames of the second sequence contains at least two portions that appear at different frames in the first sequence. The frames of the second sequence are stored in a second memory 15 for subsequent processing or display by a display unit 16. The frame generator 14 may include a warping unit 17 for spatially warping at least two of the portions prior to copying to the second sequence.

The system 10 may in practice be realized by a suitably programmed computer having a graphics card or workstation and suitable peripherals, all as are well known in the art.

In the system 10 the at least three different input frames may be temporally contiguous. The system 10 may further include an optional alignment unit 18 coupled to the first memory for pre-aligning the first sequence of video frames. In this case, the camera 11 will be coupled to the alignment unit 18 so as to stored the pre-aligned video frames in the first memory 12. The alignment unit 18 may operate by:

computing image motion parameters between frames in the first sequence;

warping the video frames in the first sequence so that stationary objects in the first dynamic scene will be stationary in the video.

Likewise, the system 10 may also include an optional time slice generator 19 coupled to the selection unit 13 for sweeping the aligned space-time volume by a "time front" surface and generating a sequence of time slices.

These optional features are not described in detail since they as well as the terms "time front" and "time slices" are fully described in above-mentioned WO2006/048875 to which reference is made.

Figure 12:
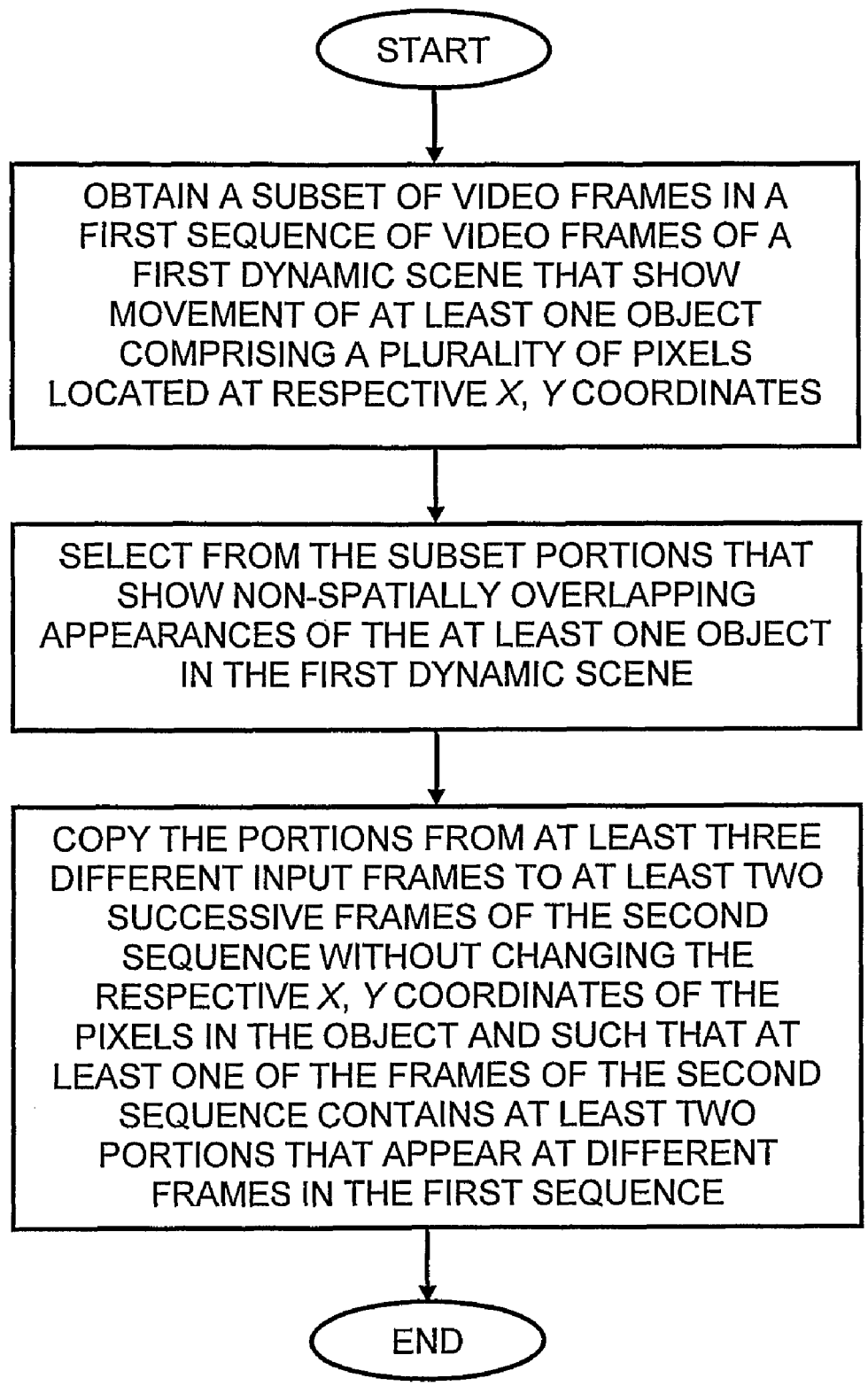
FIG. 12 is a flow diagram showing the principal operation carried in accordance with the invention.

For the sake of completeness, FIG. 12 is a flow diagram showing the principal operations carried out by the system 10 according to the invention.

15. Discussion

Video synopsis has been proposed as an approach for condensing the activity in a video into a very short time period. This condensed representation can enable efficient access to activities in video sequences. Two approaches were presented: one approach uses low-level graph optimization, where each pixel in the synopsis video is a node in this graph. This approach has the benefit of obtaining the synopsis video directly from the input video, but the complexity of the solution may be very high. An alternative approach is to first detect moving objects, and perform the optimization on the detected objects. While a preliminary step of motion segmentation is needed in the second approach, it is much faster, and object based constraints are possible. The activity in the resulting video synopsis is much more condensed than the activity in any ordinary video, and viewing such a synopsis may seem awkward to the non experienced viewer. But when the goal is to observe much information in a short time, video synopsis delivers this goal. Special attention should be given to the possibility of obtaining dynamic stroboscopy. While allowing a further reduction in the length of the video synopsis, dynamic stroboscopy may need further adaptation from the user. It does take some training to realize that multiple spatial occurrences of a single object indicate a longer activity time. While we have detailed a specific implementation for dynamic video synopsis, many extensions are straight forward. For example, rather than having a binary "activity" indicator, the activity indicator can be continuous. A continuous activity can extend the options available for creating the synopsis video, for example by controlling the speed of the displayed objects based on their activity levels. Video synopsis may also be applied for long movies consisting of many shots. Theoretically, our algorithm will not join together parts from different scenes due to the occlusion (or discontinuity) penalty. In this case the simple background model used for a single shot has to be replaced with an adjustable background estimator. Another approach that can be applied in long movies is to use an existing method for shot boundary detection and create video synopsis on each shot separately.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A computer-implemented method for creating a synopsis video by transforming a source video that includes a sequence of video frames of a first dynamic scene captured by a video camera, to a shorter synopsis video that includes a sequence of video frames depicting a second dynamic scene, the method comprising:
   (a) obtaining a subset of video frames in said source video that show movement of at least two non-background source objects, each source object being represented by a set of pixels in at least three different frames of the source video;
   (b) selecting at least two source objects from said source video, and sampling from each selected source object one or more non identical synopsis objects by temporal sampling;
   (c) determining for each synopsis object a respective display time for starting its display in the synopsis video; and
   (d) generating the synopsis video, wherein the synopsis video is characterized by a shorter duration than the source video, by displaying the selected synopsis objects each at its respective determined display time while maintaining the spatial location of the synopsis objects as the spatial location of their respective source objects as captured in the source video,
   wherein for at least two source objects, each derived from different respective times in the source sequence, their respective synopsis objects are displayed simultaneously in the synopsis video, and
   wherein at least two of the selected synopsis objects are displayed in the synopsis video in a chronological order of appearance that is different from the chronological order of appearance of their corresponding source objects in the source video.

2. The method according to claim 1, wherein the synopsis video contains all objects of interest in the source video.

3. The method according to claim 1, wherein the source video is captured by a camera that is rotated relative to an axis at a fixed location and wherein the method further comprises spatially warping at least two of said synopsis objects portions prior to displaying the synopsis objects in the synopsis video.

4. The method according to claim 1, wherein the at least three different frames of the source video are temporally contiguous.

5. The method according to claim 1, further comprising spatially warping at least two of said synopsis objects portions prior to copying to the second sequence displaying the synopsis objects in the synopsis video.

6. The method according to claim 1, further comprising pre-aligning the frames of the source video so as to produce an aligned source video having an aligned space-time volume by:
   (a) computing image motion parameters between frames in the source video;
   (b) warping the video frames in the source video so that stationary objects in the first dynamic scene will be stationary in the aligned source video,
   wherein the obtaining, the selecting, the determining, and the generating are carried out based on the aligned source video.

7. The method according to claim 1, wherein the video synopsis is usable for video summarization.

8. The method according to claim 7, wherein the synopsis video is further usable for surveillance.

9. The method according to claim 7, wherein the synopsis video is further usable for increasing activity density of a movie.

10. The method according to claim 7, wherein the synopsis video is further usable for video indexing.

11. The method according to claim 10, further comprising maintaining for each pixel in the synopsis video a pointer to a corresponding pixel in the source video.

12. A system for transforming a source sequence of video frames of a first dynamic scene captured by a video camera to a shorter synopsis sequence of at least two video frames depicting a second dynamic scene, the system comprising:
   a first memory for storing a subset of video frames in said source sequence that show movement of at least one object being a connected subset of pixels from at least three different source frames of the source sequence;
   a selection unit coupled to the first memory for selecting at least three source objects from said source sequence, and sampling from each selected source object one or more synopsis objects by temporal sampling;
   a frame generator for determining for each synopsis object a respective display time for starting its display in the synopsis video and generating the synopsis video by displaying selected synopsis objects or objects derived therefrom each at its respective predetermined display time without changing the spatial location of said objects or the respective objects derived therefrom in the first dynamic scene such that at least three source objects, each derived from different respective times in the source sequence, are displayed simultaneously in at least one frame of the synopsis video;
   a second memory coupled to the frame generator for storing frames of the synopsis sequence;
   means for coupling a display device to the second memory for displaying the second dynamic scene; and
   a time slice generator coupled to the selection unit for sweeping the aligned space-time volume by a "time front" surface and generating a sequence of time slices.

13. The method according to claim 1, wherein source objects are selected and a respective time for starting the display of each synopsis object is determined so as to optimize a cost function.

14. The method according to claim 1, wherein the source video is captured by a static camera at a fixed location.

15. The method according to claim 1, wherein the selected source objects are spatially contiguous in the first dynamic scene.

16. The method according to claim 1, further comprising stitching the non background source objects and a background, into a seamless video.

17. A computer program product for creating a synopsis video by transforming a source video that includes a sequence of video frames of a first dynamic scene captured by a video camera to a shorter synopsis video that includes a sequence of video frames depicting a second dynamic scene, the computer program product comprising:

a computer readable storage medium having computer readable program embodied therewith, the computer readable program comprising:
(a) computer readable program configured to obtain a subset of video frames in said source sequence that show movement of at least two non-background source objects, each source object being represented by a set of pixels in at least three different frames of the source video;
(b) computer readable program configured to select at least two source objects from said source video, and sample from each selected source object one or more non identical synopsis objects by temporal sampling;
(c) computer readable program configured to determine for each synopsis object a respective display time for starting its display in the synopsis video; and
(d) computer readable program configured to generate the synopsis video wherein the synopsis video is characterized by a shorter duration than the source video, by displaying the selected synopsis objects each at its respective determined display time while maintaining the spatial location of the synopsis objects as the spatial location of their respective source objects as captured in the source video,
wherein for at least two source objects, each derived from different respective times in the source sequence, their respective synopsis objects are displayed simultaneously in the synopsis video, and
wherein at least two of the selected synopsis objects are displayed in the synopsis video in a chronological order of appearance that is different from the chronological order of appearance of their corresponding source objects in the source video.

18. A system for creating a synopsis video by transforming a source video that includes a sequence of video frames of a first dynamic scene captured by a video camera, to a shorter synopsis video that includes a sequence of video frames depicting a second dynamic scene, the system comprising:
a memory configured to store a subset of video frames in said source video that show movement of at least two non-background source objects, each source object being represented by a set of pixels in at least three different frames of the source video;
a selection unit configured to select at least two source objects from said source video and sample from each selected source object one or more non identical synopsis objects by temporal sampling; and
a frame generator configured to: (i) determine for each synopsis object a respective display time for starting its display in the synopsis video; and (ii) generate the synopsis video, wherein the synopsis video is characterized by a shorter duration than the source video, by displaying the selected synopsis objects each at its respective determined display time while maintaining the spatial location of the synopsis objects as the spatial location of their respective source objects as captured in the source video,
wherein for at least two source objects, each derived from different respective times in the source sequence, their respective synopsis objects are displayed simultaneously in the synopsis video, and
wherein at least two of the selected synopsis objects are displayed in the synopsis video in a chronological order of appearance that is different from the chronological order of appearance of their corresponding source objects in the source video.

* * * * *